(No Model.)

J. MURDOCK, Jr.
HAND STAMP.

No. 258,666. Patented May 30, 1882.

WITNESSES:
John Sorrus
G. P. Tangeman

Jas Murdock Jr  INVENTOR
by James W. See
ATTORNEY

UNITED STATES PATENT OFFICE.

JAMES MURDOCK, JR., OF CINCINNATI, OHIO.

HAND-STAMP.

SPECIFICATION forming part of Letters Patent No. 258,666, dated May 30, 1882.

Application filed March 24, 1882. (No model.)

*To all whom it may concern:*

Be it known that I, JAMES MURDOCK, Jr., of Cincinnati, Hamilton county, Ohio, have invented certain new and useful Improvements in Hand-Stamps, of which the following is a specification.

Figure 4:
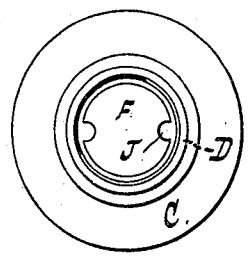
Figure 1:
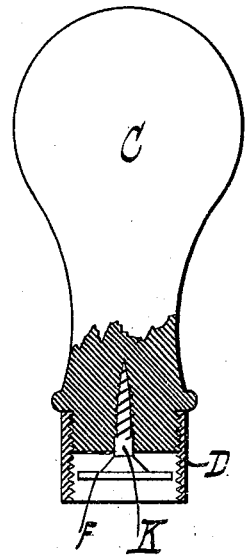
Figure 5:
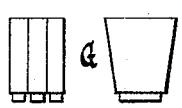
Figure 2:
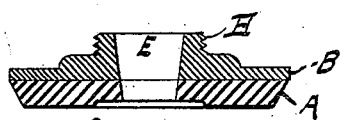
Figure 3:
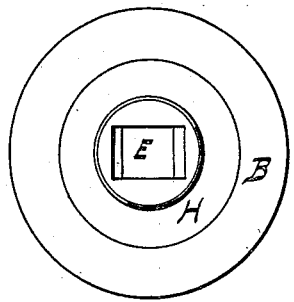

In the accompanying drawings, Figure 1 is a side view of the handle; Fig. 2, a section of the die; Fig. 3, a plan of the die; Fig. 4, a bottom view of the handle, and Fig. 5 side views of the date types.

The rubber dies of rubber stamps, being made singly to order, will vary in thickness. Removable dates for such stamps, being made in quantities, can be manufactured to uniform dimensions. After a rubber die is made the date-cavity must be adjusted in depth so as to cause the date-types to face flush with the die. This is generally done by shims fixed in the bottom of the date-cavity.

My invention relates to the means for effecting the adjustment of depth of date-cavity.

A is the rubber die, cemented to the die-plate B, having threaded boss H, on which screws the ferrule D of the handle C.

E is the dovetailed date-cavity in the die, and G represents the date-types.

F is a disk having a wood-screw, K, soldered to it. The screw enters the handle C, and the disk has peripheral notches J, by which it can be turned by a properly-formed screw-driver. The disk F is nearly of the diameter of the inside of the ferrule, and presents a plain flat adjustable bottom to the ferrule-cavity, but one which cannot be adjusted without special tools.

In operation the rubber die is cemented to its plate, a set of dates inserted, the handle attached, and the die-face tested. The handle is then removed and the disk adjusted till trial approves its position. The adjustment will be correct during the life of that particular rubber die.

I claim as my invention—

The die-plate B, having threaded boss H and cavity E, handle C, threaded ferrule D, fixed on the handle and projecting therefrom, and the disk F, having screw K and notches J, all combined substantially as and for the purpose set forth.

JAS. MURDOCK, JR.

Witnesses:
J. W. SEE,
F. WILLIAMS.